(12) United States Patent
Brandt (10) Patent No.: US 9,569,213 B1
(45) Date of Patent: Feb. 14, 2017

(54) SEMANTIC VISUAL HASH INJECTION INTO USER ACTIVITY STREAMS

(71) Applicant: ADOBE SYSTEMS INCORPORATED, San Jose, CA (US)

(72) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/834,730

(22) Filed: Aug. 25, 2015

(51) Int. Cl.
*G06F 9/30* (2006.01)

(52) U.S. Cl.
CPC ......... *G06F 9/3005* (2013.01); *G06F 9/30181* (2013.01)

(58) Field of Classification Search
CPC .......................... G06F 9/3005; G06F 9/30181
USPC .................................................. 382/232, 325
See application file for complete search history.

(56) References Cited

U.S. PATENT DOCUMENTS

| | | | | |
|---|---|---|---|---|
| 5,161,214 A * | 11/1992 | Addink | ............. | G06F 17/30011 |
| 6,714,665 B1 * | 3/2004 | Hanna | ...................... | G06K 9/00 |
| | | | | 382/106 |
| 7,477,688 B1 * | 1/2009 | Zhang | .................. | H04N 19/159 |
| | | | | 375/240 |
| 7,903,282 B2 * | 3/2011 | Furukawa | ................ | H04N 1/40 |
| | | | | 358/1.13 |
| 8,611,617 B1 * | 12/2013 | Baluja | ............... | G06F 17/30247 |
| | | | | 382/124 |
| 2004/0057065 A1 * | 3/2004 | Michimura | ............... | G06F 9/50 |
| | | | | 358/1.13 |
| 2007/0165253 A1 * | 7/2007 | Usui | ................... | H04N 1/32122 |
| | | | | 358/1.9 |
| 2008/0130998 A1 * | 6/2008 | Maidment | ......... | G06F 17/30247 |
| | | | | 382/181 |
| 2008/0187249 A1 * | 8/2008 | Konishi | ............... | G06K 9/2054 |
| | | | | 382/306 |
| 2010/0253971 A1 * | 10/2010 | Ido | ........................ | G06F 3/1203 |
| | | | | 358/1.15 |
| 2010/0266214 A1 * | 10/2010 | Jobson | .................... | G06T 5/003 |
| | | | | 382/224 |
| 2011/0317938 A1 * | 12/2011 | Takasaka | .................. | G06T 1/20 |
| | | | | 382/303 |
| 2012/0275647 A1 * | 11/2012 | Gabe | ..................... | G06F 3/1267 |
| | | | | 382/103 |
| 2013/0142406 A1 * | 6/2013 | Lang | .................... | G06K 9/6293 |
| | | | | 382/128 |
| 2013/0170738 A1 * | 7/2013 | Capuozzo | ......... | G06F 17/30265 |
| | | | | 382/159 |

(Continued)

*Primary Examiner* — Yubin Hung
(74) *Attorney, Agent, or Firm* — Shook Hardy & Bacon, LLP (57) ABSTRACT

In various implementations, an abstraction is generated from an asset associated with an asset-modifying workflow. The abstraction can be embedded into an activity stream generated from an asset-modification application and communicated to a remote server device for collection and analysis. The remote server device, upon receiving at least the abstraction, can determine a contextual identifier for association with the abstraction and the asset associated with the asset-modifying workflow. The remote server device can conduct usage analysis on data received from the activity stream in association with the contextual identifier, and further send a signal to the asset-modification application to customize the workflow based on the contextual identifier determined to be associated with the abstraction and asset.

20 Claims, 6 Drawing Sheets

(56) References Cited

U.S. PATENT DOCUMENTS

| | | | |
|---|---|---|---|
| 2013/0286018 A1* | 10/2013 | Freyhult | G09G 5/393 345/428 |
| 2014/0037160 A1* | 2/2014 | Matsuzaki | G06T 7/0012 382/128 |
| 2014/0086486 A1* | 3/2014 | Pillman | G06T 5/003 382/173 |
| 2014/0168708 A1* | 6/2014 | Chew | H04N 1/00957 358/1.18 |
| 2014/0212054 A1* | 7/2014 | Lee | G06K 9/3275 382/224 |
| 2015/0093149 A1* | 4/2015 | Tyagi | B41M 3/16 399/130 |
| 2015/0304640 A1* | 10/2015 | Brooks | H04N 13/0011 348/56 |

* cited by examiner

FIG. 2

"PORTRAIT" ⟵ 300A

```
>> session_summary(hl_log,starts(2));
00:00:00            : Launched
00:00:16            : Rotate Canvas
00:00:16-00:00:17   : Open [ x 2 ]
00:00:17            : Loading File Type = JPG
00:00:19            : History Eraser
00:00:41            : Lasso
00:02:16            : Dust & Scratches
00:02:18            : Deselect
00:02:31            : Lasso
00:02:38            : Dust & Scratches
00:02:39            : Deselect
00:02:52            : Lasso
00:03:04            : Dust & Scratches
00:03:05            : Deselect
00:04:08            : Lasso
00:04:37            : Dust & Scratches
00:04:38            : Deselect
00:07:04-00:09:28   : Layer Via Copy [ x 2 ]
00:09:28            : Unsharp Mask
00:09:46            : Master Opacity Change
00:11:15            : Gaussian Blur
00:11:26            : Add Layer Mask
00:12:42            : Unlink Mask
00:12:46-00:12:54   : Invert [ x 2 ]
00:12:54            : Layer Mask Density Change
00:13:01            : Apply Layer Mask
00:13:47            : Make Layer
00:13:50-00:15:18   : Spot Healing Brush [ x 45 ]
00:15:18            : AutoSave interval: 10
```

FIG. 3A

"DESIGN" ⟵ 300B

```
>> session_summary(hl_log,starts(29));
00:00:00            : Launched
00:05:57            : New
00:06:02-00:06:19   : Open [ x 3 ]
00:06:19            : Loading File Type = JPG
00:06:22            : Rectangular Marquee
00:06:26            : Drag Selection
00:06:30            : Move Selection
00:06:37            : Drag Selection
00:07:06            : Deselect
00:10:03            : Type Tool
00:10:05            : Move
00:13:57-00:15:31   : Preferences Changed [ x 2 ]
00:15:31            : New Guide
00:15:34            : Delete Guide
00:15:39            : Move
00:15:47-00:16:26   : New Guide [ x 2 ]
00:16:26            : Type Tool
00:16:37            : Move
00:16:49-00:17:01   : New Guide [ x 2 ]
00:17:01            : Move
00:17:04-00:18:50   : Drag Guide [ x 2 ]
00:18:50            : Type Tool
00:19:13            : Move
00:21:43-00:22:47   : Type Tool [ x 2 ]
00:22:47            : Move
00:22:53            : New Guide
00:23:13            : Move
00:23:29            : Edit Type Layer
```

SEMANTIC VISUAL HASH INJECTION INTO USER ACTIVITY STREAMS

BACKGROUND

Collecting application usage data for user research and product development has become commonplace in software applications. Computers and electronic devices generally have access to communication networks, such as the Internet, to freely transmit usage data, among other things, to a server or central usage data repository so that various types of user and/or product analysis can be performed thereon. Asset-modification applications, such as Adobe® Photoshop® or Adobe® Illustrator®, can generate event logs, generally on a very high level, which comprise sequences of user actions within sessions of application activity. For instance, the event logs can include, among other things, references to tools and/or features used on an asset in an asset-modifying workflow, and timestamps associated with each instance of use. In some instances, these event logs can be collected and transmitted to a server through user activity streams, to analyze how the applications and tools provided therein are being employed. The ability to extrapolate meaningful insight into the activity streams is limited, however, without deeper contextual knowledge about the asset or its visual content.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to improving the extrapolation of usage data and also improving asset-modifying workflows by identifying characteristics of an asset's visual content, while maintaining the inability to actually view its visual content. In essence, embodiments can compare a hash of a subject image to a library of categorized image hashes to determine a category with which the subject image should be associated. To this end, the identified category can be useful for extrapolating relationships between the identified category and information in the activity stream, or for optimizing an image-modification workflow based on an identified category for the image, as will be described.

In one embodiment, a computing device can generate a hash from an image that is the subject of an asset-modifying workflow. The image hash, which is a digital fingerprint of sorts, is an abstraction of the image and does not present any discernable visual content of the image. Although the image content is undeterminable by its hash alone, the image can be identified by its hash (i.e., a fingerprint match) and compared to other hashes to identify contextual similarities there between. Although the actual image content cannot be collected, for privacy reasons and the like, the undeterminable hash can still be analyzed to determine a probable visual category to assign its corresponding image. By comparing the hash to a large database of categorized image hashes, at least one substantially similar image hash can be identified, such that the metadata (e.g., image genre, image category, tags, etc.) can be assigned to the image that is the subject of the asset-modifying workflow. In some aspects, once a genre or category of the image is determined, the computing device can automatically customize or optimize the asset-modifying workflow based on the determined genre or category.

In another embodiment, a computing device can receive a first activity stream associated with a first asset-modifying workflow and a hash from an image that is the subject of the first asset-modifying workflow. The hash can be analyzed to determine a suitable visual category to assign its corresponding image. When comparing the hash to a large database of categorized image hashes, at least one substantially similar image hash can be identified, such that the metadata (e.g., image genre, image category, tags, etc.) can be assigned to the image that is the subject of the first asset-modifying workflow. The computing device can, at another time, receive a second activity stream associated with a second asset-modifying workflow, and the same or substantially similar hash of the image subject to the first asset-modifying workflow, from the second asset-modifying workflow. In this regard, the computing device can determine that a particular image is the subject of multiple workflows, each workflow occurring at different times, with different users, and/or with different applications. A workflow map can be generated that corresponds to the genre or category of the image and portions of the first and second activity streams, to improve the analysis of usage data (i.e., improved extrapolation of relevant data). In some aspects, the workflow map can be employed to customize or optimize asset-modifying workflows based on a determined genre or category of an image.

BRIEF DESCRIPTION OF THE DRAWINGS

The present invention is described in detail below with reference to the attached drawing figures, wherein:

FIGS. 3A-3B illustrate exemplary activity streams including event logs generated by asset-modification applications in accordance with implementations of the present disclosure;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Conventional asset-modification applications, such as Adobe® Photoshop® or Adobe® Illustrator®, can be configured to, among many other things, track a user's workflow event history. As will be used herein, an asset refers to any type of electronic document or file, digital content, digital image, screenshot, or representation thereof. The asset can include an image, a graphics layer, a combination of two or more graphics layers, a vector, a combination of two or more vectors, a frame of a video, or any combination and/or portion thereof. The workflow event history, on a very high level, includes a ledger that logs, on a high level, an event each time an asset-modifying tool or action (e.g., cut, copy, move, filter, blur, contrast, saturate, type, etc.) is employed, and a timestamp associated with the event. The workflow event history corresponds to each session of application activity. In one embodiment, the workflow event history can be stored locally and displayed as a timeline, and can sometimes be used to jump to various asset states (i.e., undo and redo actions). In some embodiments, the workflow event history can further, or alternatively, be collected by a third party or developer to analyze usage data about the asset-modification application. More particularly, the workflow event history can be communicated to a remote computing device, via user activity streams, to be analyzed and employed for providing a developer with metrics to gain a better understanding about the applications' user base and how the applications' various tools are utilized.

In some embodiments, each session of activity can be, in essence, an asset-modifying workflow. The asset-modifying workflow can be application dependent, such that each time an asset is passed from one application to another, a new workflow is initiated. In this regard, when each time a session of activity is ended (e.g., the application and/or asset is closed), and subsequently restarted (e.g., the application and/or asset is reopened), a new workflow can be initiated. In some other embodiments, an asset-modifying workflow can be asset dependent, such that the workflow includes a combination of all sessions of activity associated with the asset. In other words, the asset-modifying workflow can include the entire editing process of an asset, including all asset-modification features and/or tools applied to the asset, from within one or more asset-modification applications. The asset-modifying workflow can represent all aspects of the aforementioned session(s) of activity, including the tools and/or features made available to the user.

The contextual understanding achieved through activity stream analysis can be substantially improved with knowledge of the asset's content (e.g., the visual content of the image) on which the users are working. If, for example, the asset's visual content that is the subject of the activity stream is analyzed in conjunction with the activity steam, a much greater contextual understanding of the activity stream can be obtained. By way of example only, if an activity stream logs actions indicating usage of an high dynamic range (HDR) filter, an increasing contrast/vibrancy tool, an increasing sharpness tool, a horizon adjustment tool, and the like, and the asset content was known to be a landscape, the metrics associating the logged actions and the landscape, or a similarly configured landscape image, can generate a much richer understanding of the user stream data. As such, for the aforementioned example, the collection and analysis of data similar to this over time may lead to a determination that these tools are generally associated with landscape images. In contrast, if the same activity stream was received alone, without any context regarding the asset's visual content, the contextual understanding from this usage data can be rather limited.

As such, embodiments of the present disclosure are directed to improving activity stream analysis and optimizing asset-modifying workflows for an asset, while maintaining the inability to view the visual content of the asset. By generating abstractions (e.g., image hashes) from assets, the asset's actual content can remain private to the user, while the abstraction can still be communicated to the developer, for example, for further contextual analysis. A hash, which can be analogized to a digital fingerprint, can be analyzed and compared with other hashes to determine whether the asset, from which the hash was generated, is the same, similar, or different to varying degrees. To this end, when compared to a large database or plurality of categorized image hashes (e.g., landscape, portrait, design, urban scene, etc.), a subject hash can be analyzed and determined to fall into a particular category which, when analyzed in light of an activity stream, can provide more depth into the contextual analysis of the activity stream.

In some embodiments, the asset-modification application can be configured to generate an abstraction from the subject asset (i.e., the asset that is subject to the asset-modifying workflow). The abstraction can be the result of processing the asset through a cryptographic hash algorithm or a perceptual hash algorithm. In some aspects, the abstraction can be the result of any algorithmic function performed on an asset that can render the visual characteristics different and/or undeterminable, but remain operable for comparing and identifying with other abstractions. In some other aspects, the abstraction does not have to change the visual characteristics of the image, but can be an altered version (e.g., a thumbnail) of an image, an inverse of an image, or selected portions (e.g., pixels) of an image. While it is contemplated that the abstraction can be any modification of an asset, it is within the scope of the present disclosure to employ an algorithmic function on the asset so as to render the visual characteristics thereof unidentifiable for maintaining content privacy, while maintaining the ability to compare and identify the characteristics through the abstraction, as will be described.

In more detail, a perceptual hash algorithm can generate a perceptual hash (e.g., a digital fingerprint) from an asset, while stripping away the discernable visual characteristics of the asset. The perceptual hash of a first asset can generally be compared to a perceptual hash of another substantially similar second asset, and the perceptual hashes of both will be analogous or substantially similar. In some instances, a similarity score can be calculated based on the degree of similarity between two or more different hashes. Thus, small differences between two similar assets may not have substantial effect on the perceptual hashes generated therefrom. In this regard, two similar assets may have a generally high similarity score, while two very different assets may have a relatively low similarity score. A cryptographic hash algorithm, on the other hand, generates a cryptographic hash from an asset. The cryptographic hash relies on the "avalanche effect" of a small change in input value creating a drastic change in output value. As such, small differences between two similar assets will have enormous impact on the cryptographic hashes generated therefrom. Cryptographic hashes are typically used to identify exact replicas between two or more assets, whereas perceptual hashes can be employed to identify identical or similar characteristics between two or more assets. In this regard, various embodiments described herein will reference perceptual hashes when describing an image "hash," though any of the aforementioned embodiments of an abstraction are considered within the purview of the present disclosure.

Moving forward, some embodiments of the invention can embed the generated hash of an image into the activity stream that is communicated to the remote server device (e.g., the developer or third party) for analysis. Due to the generally compact nature of image hashes, communication of the hash over a network will have minimal impact on network bandwidth and processing speeds. In more detail, the hash size can generally range between 10-100 bytes per image. In one embodiment, the hash is sized about 64 bytes per image. In one aspect, the hash can be embedded into various portions of the activity stream. For instance, the hash can be embedded into the activity stream upon opening an asset. In another instance, the hash can be embedded into the activity stream with each logging of an action that is performed on the asset or with each event associated to the asset. It is contemplated that the hash can be communicated with the activity stream in a variety of asset-modifying scenarios.

Upon the receipt of the abstraction, alone or with the activity stream, the remote computing device can be configured to analyze the abstraction to determine a contextual identifier to associate therewith, as will be described. A contextual identifier, as will be used herein, can be any piece of information or data that can be used to provide context to the visual components of an asset. The contextual identifier can be in the form of metadata and associated directly or indirectly with an asset. A contextual identifier can include keywords or "tags" that can describe the visual content or, in some instances, a category of an asset. By way of example only, a contextual identifier for a landscape image depicting a mountainous background, clouds, and a flowing stream, may include the tags "mountains," "clouds," and "stream." In another example, the contextual identifier can be more categorical, and include a category or genre of an image, such as "landscape." In this regard, the contextual identifier provides contextual information to an associated asset, and can be saved as metadata associated with the asset.

The remote computing device can be configured to compare the received abstraction to a plurality of contextually identified abstractions, to determine a similarity score between the abstraction and each of the plurality of contextually identified abstractions. Each one of the plurality of contextually identified abstractions can be associated with a unique asset. In one aspect, the plurality of contextually identified abstractions can be stored in a database, each abstraction corresponding to a unique asset with contextual identifiers associated therewith. In another aspect, the database can include a large library of unique assets having contextual identifiers associated therewith. In this regard, the plurality of contextually identified abstractions can be generated for each unique asset in the library and cached or stored in the database in association with each corresponding asset. It is contemplated that the abstractions for each of the plurality of contextually identified abstractions can be generated at a predefined time, or on an ad-hoc basis.

Upon determining that the received abstraction is substantially similar to at least one of the contextually identified abstractions, the remote server device can associate contextual identifiers to the received abstraction, as will be described. By way of example only, if the received abstraction is associated to an asset depicting a landscape, and the received abstraction is compared to a large library of contextually identified assets (or the abstractions thereof), it is contemplated that at least one of the contextually identified assets in the library will also depict a comparable landscape and have the contextual identifier "landscape" associated therewith. In this example, the abstraction associated with the at least one comparable asset may be substantially similar to the received abstraction. Moreover, when compared by the remote server device, the received abstraction and the abstraction associated with the at least one comparable asset may generate a high similarity score. As such, the remote server device may be configured to associate the same contextual identifier of the substantially similar asset to the received asset (or abstraction thereof). To this end, the received abstraction can now be associated with the "landscape" contextual identifier.

In some embodiments, the abstraction does not need to be communicated to a remote computing device to associate with a contextual identifier. Due to the fact that abstractions can be rather small in size (e.g., approximately 64 bytes per asset), a large library of contextually identified assets can easily be made available for searching on a client device. In this regard, an asset-modification application can be configured to generate abstractions of an asset and associate the asset with a contextual identifier locally (i.e., on the client device), by implementing the same analytical logic described above with regards to the remote server device.

The ability to determine a contextual identifier of an asset while maintaining the privacy rights of the user can enable the ability to implement various improvements to asset-modifying workflows, as will be described. In one aspect, a set of asset-modifying tools particularly geared towards the modification of assets of a particular genre or category (e.g., a landscape, a portrait, a design, etc.) can be presented or made available to a user based on the determined contextual identifier. By way of example only, if an asset is a design, tools such as font selection, type effects, grid lines, etc., may be utilized more than other "landscape-type" or "portrait-type" tools. In this way, if an asset is determined to be associated with a "design" contextual identifier, the "design-type" tools may be given a unique focus or arrangement to the user or, in another aspect, the user may be prompted to confirm whether the asset is a "design" and whether his workflow can be optimized for a "design" workflow as a result of the determination as such.

Moreover, asset-modifying workflows can be improved when having a better contextual understanding about how various asset-modifying features and/or tools are used on particular types of assets (e.g., landscape, portrait, design, etc.). If, for example, a large sample of users were each modifying unique assets, it is contemplated that a subset of the assets will be associated with a particular contextual identifier (i.e., all landscape images). In this regard, this subset of assets may have a strong correlation to a particular set of asset-modifying features or tools. Over time, with more data collected (i.e., from activity streams) about particular features and/or tools being employed to modify assets associated with the particular contextual identifier, these correlations can be used to optimize the offering of tools or features based on determined contextual identifiers.

Contextual understanding about asset-modifying features and/or tools can be improved in even more detail with the ability to follow an asset between a plurality of asset-modification applications. By way of example only, if an asset is first adjusted with a first set of tools in Adobe® Photoshop® Lightroom®, then manipulated with a second set of tools in Adobe® Illustrator®, then further modified with a third set of tools in Adobe® Photoshop®, traditional methods of analyzing usage data would not be operable to tie a particular asset to these various workflows. However, with the ability to collect abstractions (i.e., a digital fingerprint) of an asset, the usage data analysis can now trace the path on which the asset travels (i.e., between a first set of tools in a first asset-modifying workflow and a second set of tools in a second asset-modifying workflow). In this regard, a deeper contextual understanding of relationships within the data can be considered and extrapolated, not only on a categorical level (i.e., between assets associated with the same contextual identifier), but also on a user level and/or an asset level, as will be described.

Figure 1:
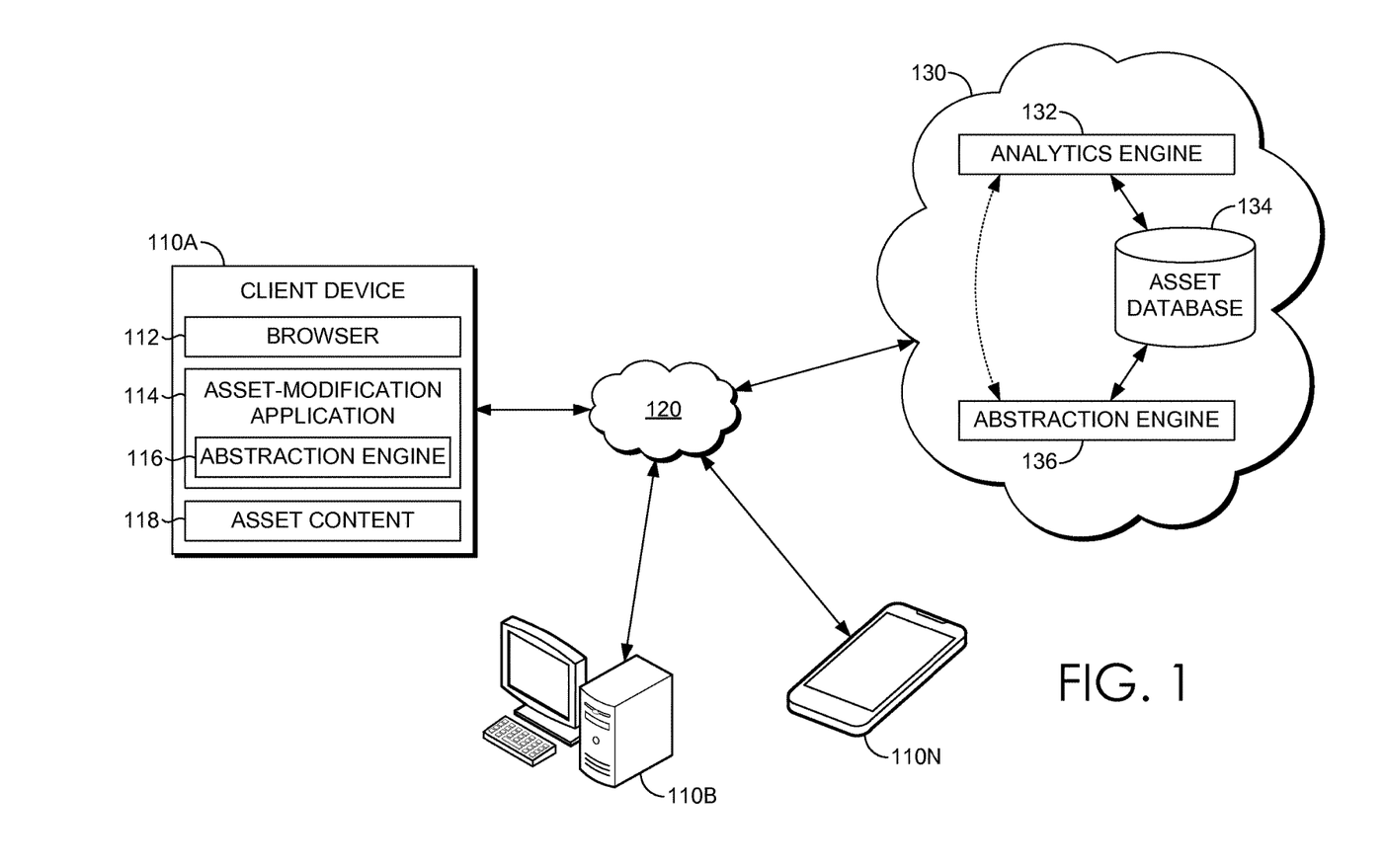
FIG. 1 is a diagram illustrating an exemplary system in accordance with implementations of the present disclosure.

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client only system or a client-server system that can be utilized to modify an asset-modifying workflow based on a contextual identifier associated with an asset. Among other components not shown, the system 100 can include any number of client devices, such as client devices 110a and 110b through 110n, network 120, and one or more remote server devices 130. It should be understood that any number of servers and client devices may be employed within system 100 within the scope of the present disclosure. Each may comprise a single device or multiple devices cooperating in a distributed environment. Additionally, other components not shown may also be included within the distributed environment.

It should be further understood that system 100 shown in FIG. 1 is an example of one suitable computing system architecture. Each of the servers and client devices shown in FIG. 1 may be implemented via a computing device, such as computing device 700, later described with reference to FIG. 7, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In various implementations, client devices 110a and 110b through 110n are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110a and 110b through 110n can include one or more processors, and one or more computer-readable media. The computer-readable media may include computer-readable instructions executable by the one or more processors. The instructions may correspond to one or more applications, such as browser 112 and personal asset management application 114, shown on client device 110a. The client devices 110a and 110b through 110n can be configured to store, among other things, content such as image content 116. The image content 116 can be stored, for instance, on one or more computer-readable media.

Browser 112, such as a web browser, can be an HTTP-compatible application (e.g. an Application that supports an HTTP protocol). A specific example of browser 112 is a Google® Chrome® web browser. Asset-modification application 114 may be independently installed on the client device as a standalone application, or can be accessed through a web-based application hosted by server 130 or other server(s) (not shown) and accessible to client devices by the browser 112. A specific example of an asset-modification application 114 is Adobe® Photoshop® or Adobe® Illustator®. In some instances, the asset-modification application 114 is accessible over the web (i.e., a cloud-based web application) through the browser 112. In some embodiments described herein, the asset-modification application 114 can include an abstraction engine 116 configured to generate an abstraction (e.g., a hash) based on at least a portion of asset content 118 stored or accessed by the client device.

The abstraction engine 116 may employ a hashing algorithm, such as the perceptual hashing algorithm that was described herein, and can generate a hash of at least a portion of an image, based on its visual content. The abstraction engine 116 can be provided with an asset, the asset's visual content, or a portion thereof, and can generate an abstraction (e.g., a hash) sized about 10-100 bytes based solely on the asset's visual content. In essence, the abstraction is generated or derived directly from the visual content of the image. Because the abstraction engine 116 only generates abstractions based on the visual content of the image, the underlying metadata associated with the image is irrelevant in the generation of the abstraction. As such, and by way of example only, if two assets of different electronic formats (e.g., JPEG vs. GIF) were configured with different resolutions (e.g., 640×480 vs 1280×960) and sizes (e.g., 360 kilobytes vs. 5 megabytes), but visually included the exact same visual content, the abstraction engine 116 could generate, based on the visual content alone, the exact same abstraction or hash for each asset.

The asset content 118 can include one or more assets (e.g., electronic documents or files, digital content, digital images, screenshots, or representations thereof). The assets can each include an image, a graphics layer, a combination of two or more graphics layers, a vector, a combination of two or more vectors, a frame of a video, or any combination and/or portion thereof, depicting a visual content portion of the asset. The visual content portion, by way of example only, can include an image foreground or background, visible text, visible objects (e.g., clouds, trees, grass, rivers, etc.) or other visible objects. The visual content can also be a function of the application context. By way of example only, a currently viewed region of the asset, or a currently selected region of the asset, can each be considered the visual content portion of an asset within the scope of the present disclosure.

The asset-modification application 114 is configured to communicate with one or more servers, such as server 130, via network 120, which may comprise the Internet. Server 130 can include one or more server computing device(s) comprising at least an analytics engine 132 and an asset database 134. The server 130 can include a plurality of computing devices configured in a networked environment, or may include a single computing device hosting both the analytics engine 132 and asset database 134. Each server computing device can include one or more processors, and one or more computer-readable media. The computer-readable media may include computer-readable instructions executable by the one or more processors. The instructions may correspond to one or more applications, such as analytics engine 132, or abstraction engine 136, shown on server device 130. The server 130 can be configured to store, among other things, an asset library including a plurality of assets and associated contextual identifiers. In some embodiments, the asset library may include a plurality of abstractions, each abstraction associated with one of the plurality of assets. As such, each abstraction may also be associated with a contextual identifier by way of association to a corresponding asset. The asset library can be stored on one or more computer-readable media, or similarly in asset database 134.

Figure 2:
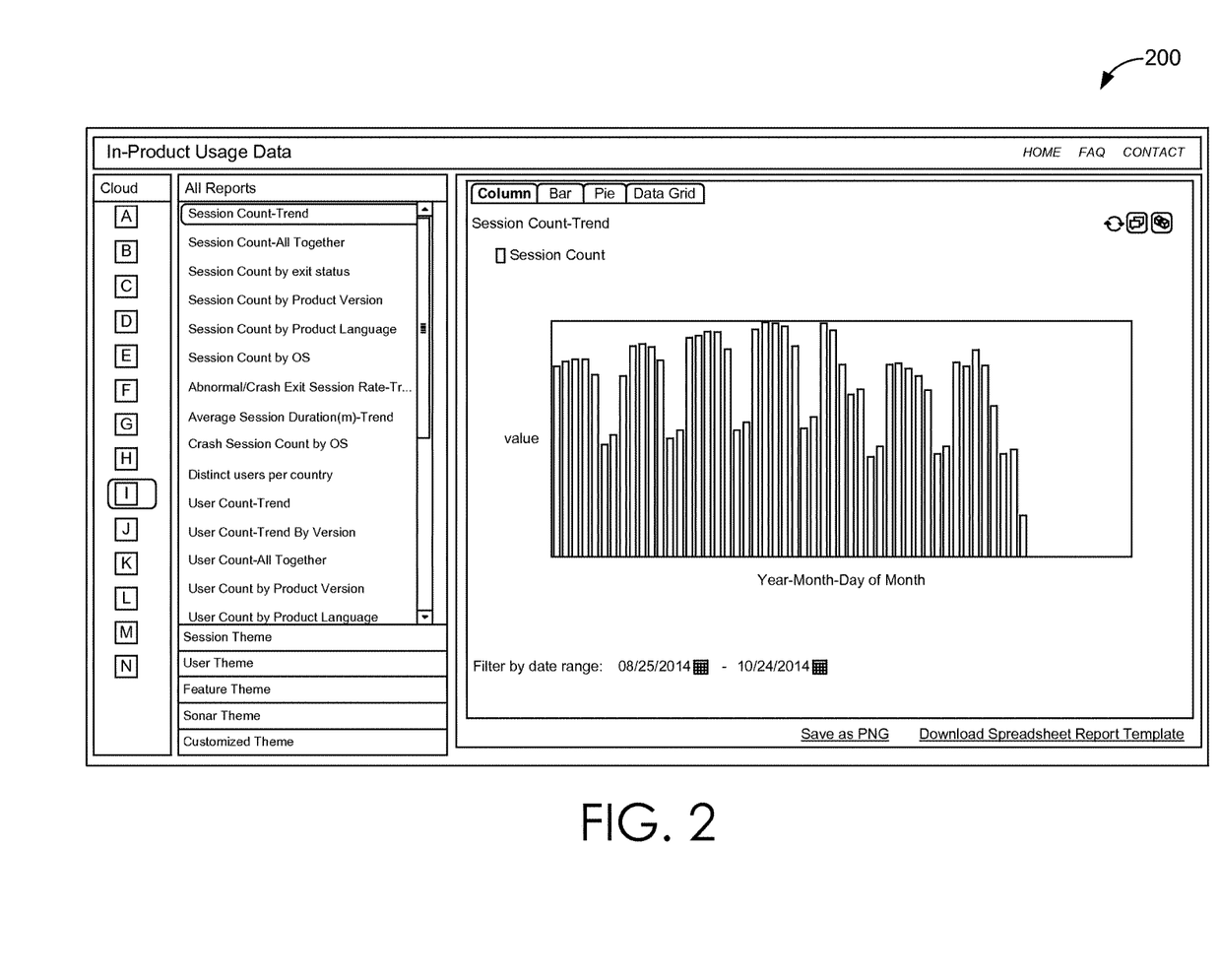
FIG. 2 illustrates an exemplary user interface for analyzing usage data from various asset-modification applications in accordance with implementations of the present disclosure.

The analytics engine 132 can be configured to analyze, among other things, usage data collected through activity streams generated from one or more asset-modification applications (e.g., Adobe® Lightroom®, Adobe® Photoshop®, Adobe® Illustrator®, etc.) run on one or more client devices, such as client device 110a. The server 130 can be configured to present at least portions of the usage data to a user, such as an administrator, in an organized, graphical format. By way of example only, FIG. 2 illustrates an exemplary user interface 200 that may be generated and presented to a user, through the server 130, to display high level usage data from various asset-modification applications. The usage data can be sorted and filtered in various combinations and configurations. In some aspects, relationships can be extrapolated from the usage data to indicate usage trends in association with geographic locations of use, user-provided information, applications, tools, features, and more. In traditional configurations, the stream of communication between the client devices, such as client device 110a, and the server 130, is unidirectional. That is, the data flows from the client devices to the server. In accordance with some embodiments described herein, the server 130 can be configured to communicate back to the client device(s), such as client device 110a. In some aspects, the server 130 can communicate a signal back to the client device(s), wherein the signal includes either metadata (e.g., contextual identifier) about an asset, or instructions for an asset-modification application to uniquely handle the asset.

Looking now to FIGS. 3A & 3B, exemplary activity streams are provided for two different workflows corresponding to two different assets. FIG. 3A, for example, illustrates an exemplary activity stream 300a arising out of a workflow associated with retouching a photograph. In this example, the activity stream 300a indicates actions such as "lasso", "dust & scratches", "unsharp mask", and the like. The server, such as server 130, can receive the activity stream 300a for analysis but, without any contextual information about the asset contents, will not make much sense out of this data. Similarly, FIG. 3B illustrates an exemplary activity stream 300b arising out of a workflow associated with graphic design. In this example, the activity stream 300b indicates actions such as "type tool", "new guide", "delete guide", and the like. These actions may commonly arise in workflows associated with graphics design but, as explained, without access to the asset content, analyzing the activity stream in the context of graphic design would be made under speculation alone. Ideally, having the ability to confidently identify contextual information (i.e., category or genre) about the asset with which an activity stream corresponds can provide improved correlations in data analysis and usage data comprehension.

Figure 4:
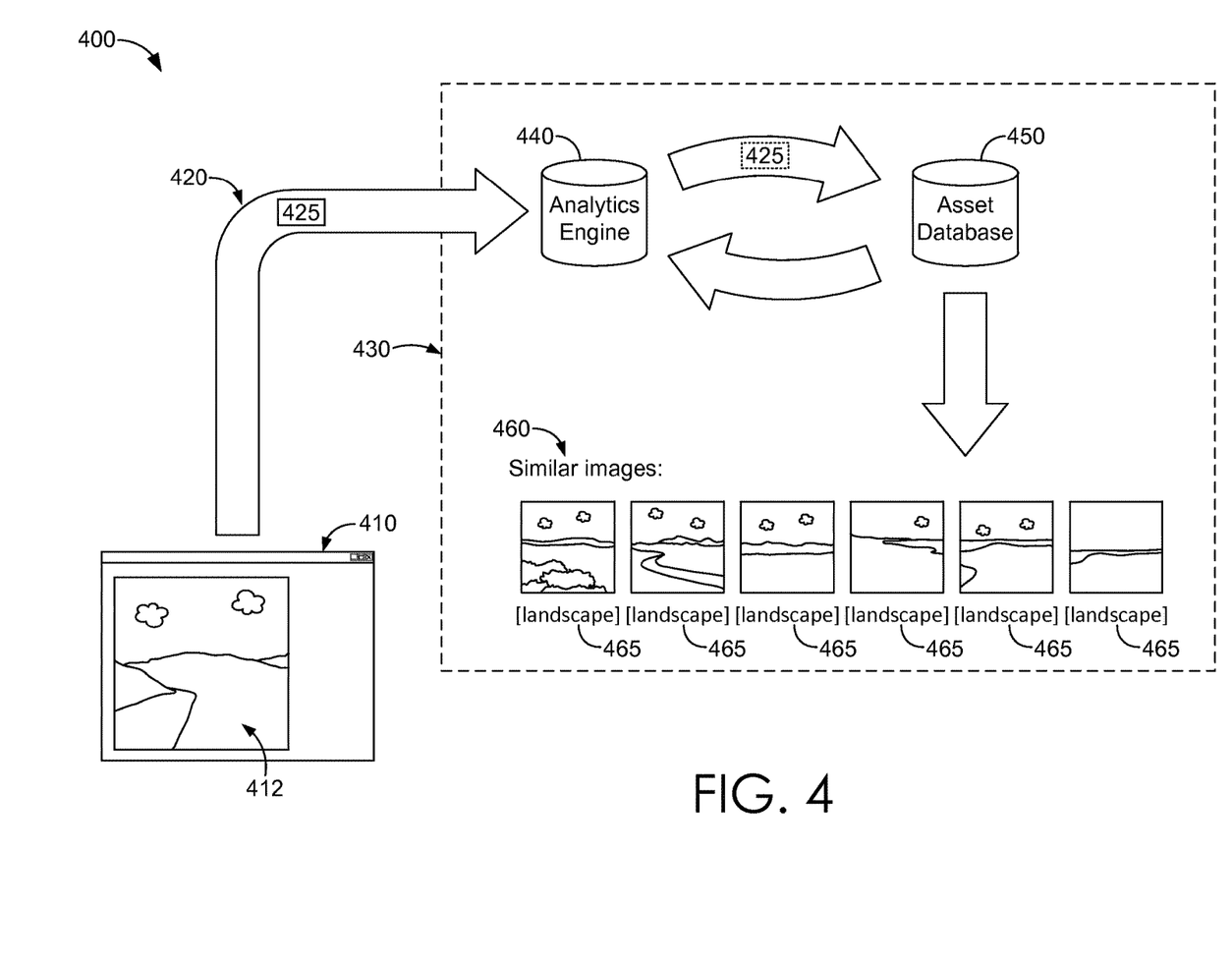
FIG. 4 is an exemplary process diagram illustrating the flow of data between components described in accordance with implementations of the present disclosure.

Referring now to FIG. 4, a diagram is provided depicting a process flow 400 in which an asset-modification application 410 (for instance, asset-modification application 114 of FIG. 1) communicates an activity stream 420 including an embedded asset abstraction 425 to the remote server 430 (such as server 13 of FIG. 1) for analysis. In the illustration, the asset-modification application 410 is working on asset 412, which illustrates a landscape. As was described, the asset-modification application 410 is configured to generate an abstraction or hash 425 from the asset 412 that is subject of the workflow and communicate the abstraction 425 to the server 430 with the activity stream 420. In one embodiment, the abstraction 425 is generated and embedded with each event or activity logged in the activity stream 420. In another embodiment, the abstraction 425 is generated and embedded only once (i.e., upon opening or closing the asset 412). In other embodiments, the abstraction 425 can be generated and embedded any number of times throughout the workflow, and communicated to the server 430 for analysis.

The server 430 can be configured to receive at least portions of the activity stream 420 for analysis. In some embodiments, the server 430 can be configured to receive at least portions of two or more activity streams for analysis. The server 430 can include an analytics engine 440 (such as analytics engine 132 of FIG. 1) which, traditionally, was operable to receive the activity stream, extrapolate high level correlations in the usage data, and display the data in a user interface (such as user interface 200 of FIG. 2). The server 430 can now also be configured to extract the abstraction 425 from activity stream 420 to perform a more in-depth contextual analysis thereon. The abstraction 425 can be communicated to an asset database 450 having a plurality of categorized or "contextually identified" assets stored therein. The asset database 450, in other words, stores a library of unique assets, each asset in the library having a contextual identifier associated therewith. By way of example only and not intended to be limiting, an asset database 450 may include 1,000,000 unique assets, with 33% of the unique assets portraying a landscape and having a "landscape" contextual identifier, 33% portraying a portrait image and having a "portrait" contextual identifier, and 33% portraying a design image and having a "design" identifier.

Upon receiving the abstraction 425, the asset database 450 can include or employ an algorithmic comparison engine (not shown) configured to algorithmically compare the abstraction 425 with abstractions associated with each of the unique assets stored in the asset database 450. The abstractions associated with each of the unique assets stored in the asset database 450 can be stored in the asset database 450 and made readily available for comparison, or can be generated on an ad-hoc basis (for instance, by abstraction engine 136 of FIG. 1). The asset database 450 can be configured to compare the abstraction 425 with an abstraction associated with each of the unique assets stored in the asset database 450, and to further generate a similarity score for each comparison to the abstraction 425 performed. In an embodiment, the similarity score can be a number based on an identified percentage of differences between two abstractions.

In the illustration, an exemplary subset of assets 460 is provided with each asset having a highest similarity score in association with the abstraction 425. In one aspect, each of the assets 460 may have the same, yet highest, similarity score when compared to all assets in the asset database 450. In another aspect, each of the assets 460 may have a similarity score above a predetermined threshold (e.g., above 90% similarity when compared to the abstraction 425) when compared to all assets in the asset database 450. The exemplary subset of assets 460 each appear to be associated with a landscape image. In this regard, each of the assets 460 includes a contextual identifier 465 indicating that the asset is categorized as a "landscape." Because the asset 412 includes image content typically found in a landscape (e.g., blue skies, green grass, a horizon, etc.), the corresponding abstraction 425, when compared to abstractions associated with contextually similar images, may be substantially similar and produce a generally high similarity score when compared.

Upon determining one or more substantially similar assets (i.e., the subset of assets 460) from the asset database 450, the server 430 or any component associated therewith can be configured to associate the contextual identifier(s) from each of the substantially similar assets (i.e., the subset of assets 460) with the abstraction 425 of asset 412. As such, the server has determined that the asset 412, which is subject to the workflow logged in activity stream 420, is associated with a particular contextual identifier (in this case, a "landscape"). The analytics engine 440, upon the determination that activity stream 420 is associated with the particular contextual identifier, can now analyze data from the activity stream 420 with the added context that the asset is associated with the particular contextual identifier (i.e., a particular image category or genre).

As one of ordinary skill in the art may appreciate, usage data analytics can generate more relevant data when provided with more information. In this particular context, the usage data received through activity streams (for instance, activity stream 420) can be analyzed and associated with particular contextual identifiers. In other words, analysis of user events and activities that were traditionally blind to the image content can now be analyzed with knowledge of a contextual identifier associated with the image. Analysis of these events, in association with a particular contextual identifier, can now be performed across a plurality of applications and users.

In more detail, usage analysis can be performed including one or more workflows through one or more asset-modification applications. By way of example, if a first editing workflow on an asset was performed on Adobe® Photoshop®, is then moved to Adobe® Lightroom® for editing in a second workflow, the contextual identifier identified and associated with the asset can provide additional information for analysis between these two asset-modification applications. In some embodiments, the asset can be identified as being the same asset moved between two different asset-modification applications, and mapped such that usage data can include a pattern of movement and activities between workflows. By collecting and analyzing movement between one or more asset-modification applications and the application of one or more asset-modifying tools and/or features, a workflow map can be generated that demonstrates or suggests, based on usage data, a popular workflow between one or more asset-modification applications and/or one or more asset-modifying tools and/or features. A workflow map such as this can be employed to optimize, modify, or customize a workflow on assets associated with a particular contextual identifier, as will be described in accordance with embodiments described herein.

The determination of contextual identifiers for assets can improve usage data analytics, but can also be employed to improve, optimize, or customize a user's workflow. Now that the analytics engine 440 can analyze data and associate various tools and application features with various contextual identifiers, correlations can be made to associate a unique subset of tools and features (i.e., identified through activity streams) to work with assets of a particular category or genre. For instance, if an activity stream for an active workflow is analyzed to determine that a subject asset is a "design," it is contemplated that the user working on the asset will generally use tools associated with design assets. By way of example only, and with brief reference to FIG. 3B, if the analytics engine 440 made a strong association between the tools "drag selection", "move selection", "type tool", etc., with the "design" contextual identifier, it is contemplated that the system can consider these correlations to improve the user workflow by offering these particular "design-type" tools to the user as he is working on the asset. As such, in one embodiment, the server 430 of FIG. 4 can be configured to communicate a signal to the asset-modification application 410 upon determining a contextual identifier for the asset 412.

The signal can include metadata determined by the server 430 to be associated with the asset 412. The metadata can include the contextual identifier or any other information determined to be in association with the asset 412. In some aspects, the asset-modification application 410 can be configured to embed the metadata with the asset 412 upon receiving the signal from the server 430. The asset-modification application 410 can receive the signal and, in response, adjust the user's workflow based on the signal. In one aspect, the asset-modification application 410 can receive the asset's contextual identifier within the signal and present a popular set of tools and/or features for working on the asset. The "popular" set of tools and/or features can either be predetermined by the developer and programmed as a static subset of tools and/or features in the application 410 or can be dynamically altered based on analytics determined by the analytics engine 440. In this regard, the signal may also include a listing of tools and/or features that have been determined, by the server 430, to be associated with a particular asset or asset having a particular contextual identifier.

In another embodiment, usage data may indicate, through workflow maps, that multiple asset-modification applications are employed for assets associated with a particular contextual identifier. By way of example only, if usage data suggests that "design" assets are typically edited in Adobe® Illustrator®, then are moved to Adobe® Photoshop® for more editing, a determination that a subject asset is a "design" may initiate a prevalent link for "exporting to Photoshop®" or may suggest to the user that he may want to export the image to Photoshop® for additional editing purposes. It is also contemplated that some embodiments may be operable to determine if various tools are available on the user's client device and suggest or recommend the purchase or acquisition of tools that are popular with assets associated with the identified contextual identifier.

Figure 5:
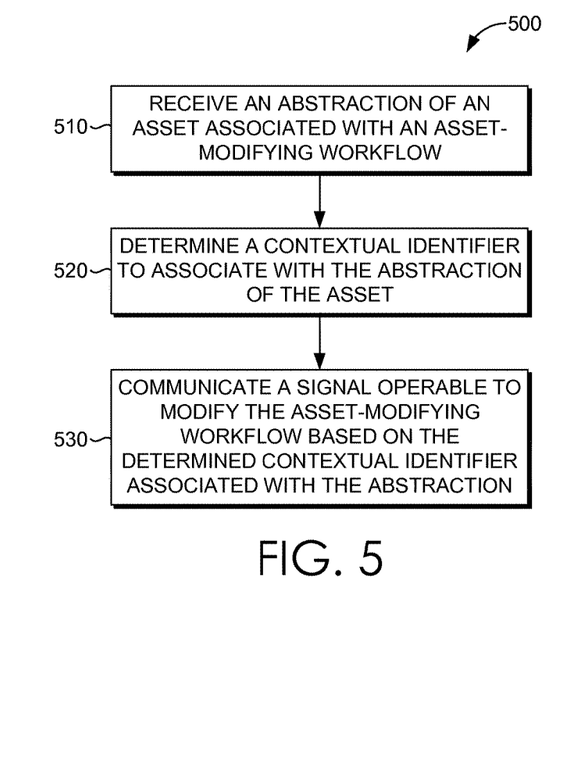
FIG. 5 is a flow diagram showing a method for modifying an asset-modifying workflow, in accordance with implementations of the present disclosure.

Having described various aspects of the present disclosure, exemplary methods are described below for analyzing abstractions of assets to improve usage data analytics and further optimize asset-modifying workflows. Referring to FIG. 5 in light of FIGS. 1-4, FIG. 5 is a flow diagram showing a method 500 for modifying an asset-modifying workflow based on a determined contextual identifier associated with an asset abstraction. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, an abstraction of an asset associated with an asset-modifying workflow is received. As was described, the abstraction can be a hash generated by employing an image hashing algorithm, such as a perceptual hash algorithm. The image hashing algorithm can be included as a component of the asset-modification application (for instance, application 114 of FIG. 1). The asset-modifying workflow describes one or more active sessions of asset-modification application(s) employed when modifying a subject asset. The asset-modifying workflow can, in some embodiments, generate an activity stream that logs all activity related to the subject asset during the active session(s). The abstraction of the asset can be received alone or in combination with usage data, such as the activity stream, as was described herein. The abstraction can be embedded into the activity stream one or more times. For instance, the abstraction can be received one or more times throughout the workflow (i.e., as the asset is being modified), i.e., as the activity stream is actively being communicated throughout a duration of the workflow or during a predetermined interval of the workflow.

Continuing at block 520, a contextual identifier can be determined to associate with the abstraction. The contextual identifier can be determined by generating a similarity score for each of a plurality of contextually identified abstractions when compared to the abstraction. The similarity score(s) can be generated by a hash comparing algorithm and associated to each of the plurality of contextually identified abstractions. Based on one or more of the plurality of contextually identified abstractions having either a highest similarity score, or a similarity score above a predefined threshold (e.g., 60%, 70%, 80, 90% similarity), the contextual identifiers associated with those either having the highest similarity score of a similarity score above the predefined threshold can be associated with the abstraction of the asset.

Moving now to block 530, a signal operable to modify the asset-modifying workflow is generated and communicated. The signal can be communicated to another component of the asset-modification application, or can be communicated to the client device from which the abstraction of the asset was received. Determining how the asset-modifying workflow is modified can be based on the determined contextual identifier associated with the abstraction. For instance, if the contextual identifier is determined to be, for instance, a "landscape," the asset-modifying workflow may be modified in accordance to a first configuration, and the signal can include information directed to modifying the workflow in accordance with the first configuration. If, for instance, the contextual identifier is determined to be a "design," in another instance, the asset-modifying workflow may be modified in accordance to a second configuration, and the signal can include information directed to modifying the workflow in accordance with the second configuration. The first and second configurations, as used herein, can include a unique subset of tools or features provided in the asset-modification application.

Figure 6:
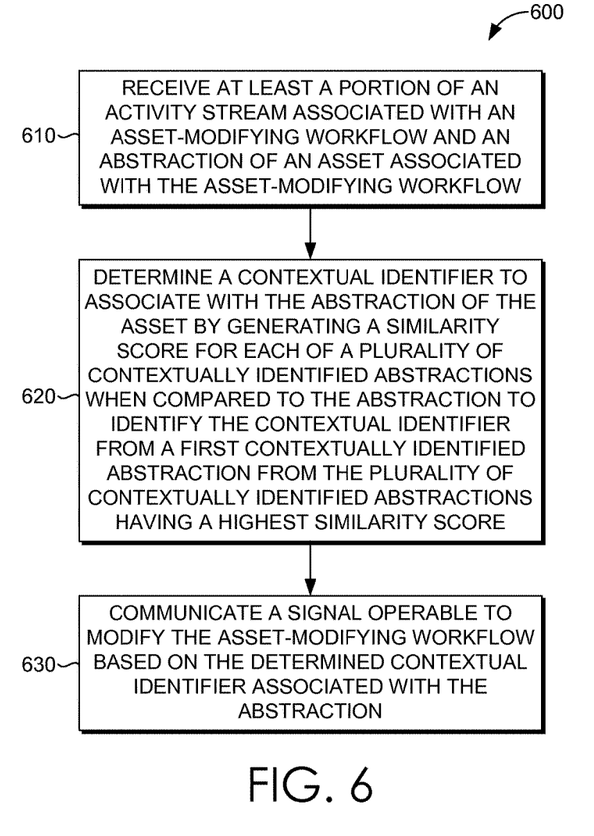
FIG. 6 is a flow diagram showing a method for generating at least a portion of a workflow map, in accordance with implementations of the present disclosure.

Referring now to FIG. 6, in light of FIGS. 1-4, FIG. 6 is a flow diagram showing a method 600 for analyzing abstractions of assets to improve usage data analytics and further optimize asset-modifying workflows. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 610, at least a portion of an activity stream associated with an asset-modifying workflow and an abstraction of an asset associated with an asset-modifying workflow are received. As was described, the abstraction can be a hash generated by employing an image hashing algorithm, such as a perceptual hash algorithm. The image hashing algorithm can be included as a component of the asset-modification application (for instance, application 114 of FIG. 1). The asset-modifying workflow describes one or more active sessions of asset-modification application(s) employed when modifying a subject asset. The asset-modifying workflow can, in some embodiments, generate an activity stream that logs all activity related to the subject asset during the active session(s). The abstraction of the asset can be received alone or in combination with usage data, such as the activity stream, as was described herein. The abstraction can be embedded into the activity stream one or more times. For instance, the abstraction can be received one or more times throughout the workflow (i.e., as the asset is being modified), i.e., as the activity stream is actively being communicated throughout a duration of the workflow or during a predetermined interval of the workflow.

Continuing at block 620, a contextual identifier can be determined to associate with the abstraction. The contextual identifier can be determined by generating a similarity score for each of a plurality of contextually identified abstractions when compared to the abstraction. The similarity score(s) can be generated by a hash comparing algorithm and associated to each of the plurality of contextually identified abstractions. Based on one or more of the plurality of contextually identified abstractions having either a highest similarity score, or a similarity score above a predefined threshold (e.g., 60%, 70%, 80, 90% similarity), the contextual identifiers associated with those either having the highest similarity score of a similarity score above the predefined threshold can be associated with the abstraction of the asset.

Moving now to block 630, a signal operable to modify the asset-modifying workflow is generated and communicated. The signal can be communicated to another component of the asset-modification application, or can be communicated to the client device from which the abstraction of the asset was received. Determining how the asset-modifying workflow is modified can be based on the determined contextual identifier associated with the abstraction. For instance, if the contextual identifier is determined to be, for instance, a "landscape," the asset-modifying workflow may be modified in accordance to a first configuration, and the signal can include information directed to modifying the workflow in accordance with the first configuration. If, for instance, the contextual identifier is determined to be a "design," in another instance, the asset-modifying workflow may be modified in accordance to a second configuration, and the signal can include information directed to modifying the workflow in accordance with the second configuration. The first and second configurations, as used herein, can include a unique subset of tools or features provided in the asset-modification application.

Figure 7:
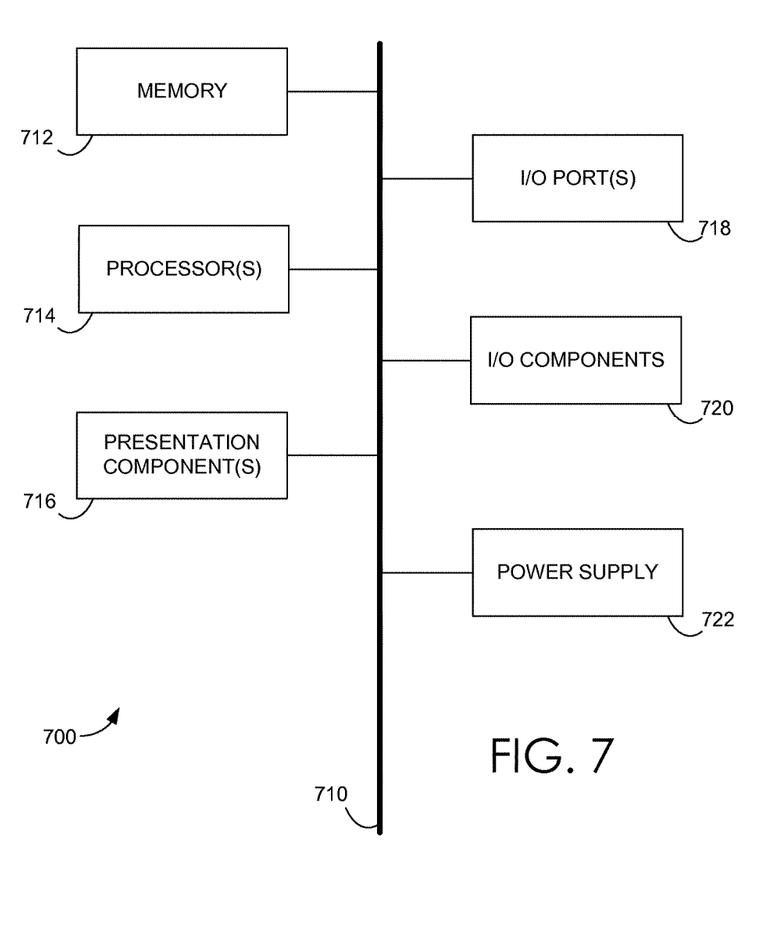
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As described above, implementations of the present disclosure provide for determining contextual identifiers for association with abstractions of assets and, in some embodiments, modifying workflows based on the determined contextual identifiers. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by at least one computing device, cause the at least one computing device to perform operations comprising:
  receiving an abstraction of an asset associated with an asset-modifying workflow;
  determining a contextual identifier based on the received abstraction of the asset;
  determining a modification to the asset-modifying workflow based on the determined contextual identifier; and
  communicating a signal operable to apply the determined modification to the asset-modifying workflow.

2. The medium of claim 1, wherein the received abstraction is a hash.

3. The medium of claim 1, wherein the asset-modifying workflow includes a set of asset-modifying tools and/or a set of asset-modifying applications.

4. The medium of claim 1, wherein the contextual identifier includes a visual category.

5. The medium of claim 1, wherein the asset is at least a portion of one of an image, a set of at least one image layer, or a frame of a video.

6. The medium of claim 1, wherein determining the contextual identifier to associate with the abstraction of the asset includes:
  generating a similarity score corresponding to each of a plurality of contextually identified abstractions by conducting an algorithmic comparison between the received abstraction and each of the plurality of contextually identified abstractions,
  identifying a highest similarity score corresponding to at least one contextually identified abstraction from the plurality of contextually identified abstractions, and
  determining the contextual identifier to associate with the received abstraction based on the at least one contextually identified abstraction corresponding to the identified highest similarity score.

7. The medium of claim 1, the operations further comprising:
  receiving at least a portion of an activity stream associated with the asset-modifying workflow, the activity stream including usage data corresponding to the asset-modifying workflow.

8. The medium of claim 7, wherein the received abstraction is embedded in the at least a portion of the activity stream.

9. The medium of claim 1, wherein the signal includes at least one of a reference to the identified contextual identifier, a recommendation to modify the asset-modifying workflow, or instructions operable to initiate a modification of the asset-modifying workflow.

10. A computer-implemented method comprising:
  receiving at least a portion of an activity stream associated with an asset-modifying workflow and an abstraction of an asset associated with the asset-modifying workflow;
  determining a contextual identifier to associate with the received abstraction of the asset by generating a similarity score for each of a plurality of contextually identified abstractions when compared to the received abstraction to identify the contextual identifier from a first contextually identified abstraction from the plurality of contextually identified abstractions having a highest similarity score;
  determining a modification to the asset-modifying workflow based on the determined contextual identifier; and
  communicating a signal operable to apply the determined modification to the asset-modifying workflow.

11. The method of claim 10, wherein the received abstraction is a hash.

12. The method of claim 10, wherein the contextual identifier includes at least a visual category.

13. The method of claim 10, wherein the visual category is one of a landscape, a portrait, and a design.

14. The method of claim 10, wherein the received abstraction is embedded in the at least a portion of the activity stream.

15. The method of claim 10, wherein the activity stream associated with the asset-modifying workflow and the received abstraction of the asset associated with the asset-modifying workflow are generated on a remote client device.

16. A computerized system comprising:
  at least one processor; and
  at least one computer storage media storing computer-usable instructions that, when used by the at least one processor, cause the at least one processor to:
  receive at least a portion of a first activity stream associated with a first asset-modifying workflow and a first abstraction of an asset associated with the first asset-modifying workflow;
  determine a contextual identifier to associate with the first abstraction of the asset;
  receive at least a portion of a second activity stream associated with a second asset-modifying workflow and a second abstraction of the asset associated with the second asset-modifying workflow, wherein the second abstraction is substantially similar to the first abstraction; and
  generate at least a portion of a workflow map that corresponds to the contextual identifier based on the at least a portion of the first activity stream associated with the first asset-modifying workflow and the at least a portion of the second activity stream associated with the second asset-modifying workflow.

17. The system of claim 16, wherein the workflow map is operable to modify a third asset-modifying workflow associated with another asset associated with the contextual identifier.

18. The system of claim 17, wherein modifying the third asset-modifying workflow includes one of customizing a set of asset-modifying tools and/or a set of asset-modifying applications.

19. The system of claim 16, wherein each of the received first and second abstraction is a hash.

20. The system of claim 16, wherein to determine a contextual identifier to associate with the first abstraction of the asset includes:

generating a similarity score corresponding to each of a plurality of contextually identified abstractions by conducting an algorithmic comparison between the received first abstraction and each of the plurality of contextually identified abstractions, identifying a highest similarity score corresponding to at least one contextually identified abstraction from the plurality of contextually identified abstractions, and determining the contextual identifier to associate with the received first abstraction based on the at least one contextually identified abstraction corresponding to the identified highest similarity score.

\* \* \* \* \*